United States Patent [19]

de la Guardia et al.

[11] Patent Number: 4,654,708
[45] Date of Patent: Mar. 31, 1987

[54] DIGITAL VIDEO SYNC DETECTION

[75] Inventors: Mario de la Guardia; Ming-Luh Kao, both of Miami, Fla.

[73] Assignee: Racal Data Communications Inc., Fort Lauderdale, Fla.

[21] Appl. No.: 506,127

[22] Filed: Jun. 20, 1983

[51] Int. Cl.[4] .................................................. H04N 5/04
[52] U.S. Cl. .................... 358/148; 358/903; 358/149
[58] Field of Search ............... 358/148, 153, 154, 143, 358/160, 141, 13, 149, 903; 364/569

[56] References Cited

U.S. PATENT DOCUMENTS

| | | | |
|---|---|---|---|
| 4,148,070 | 4/1979 | Taylor | 358/160 |
| 4,425,581 | 1/1985 | Schweppe et al. | 358/148 |
| 4,464,679 | 8/1984 | Wargo | 358/148 |
| 4,568,981 | 2/1986 | Beaulier | 358/183 |
| 4,599,611 | 7/1968 | Bowker et al. | 358/903 |

FOREIGN PATENT DOCUMENTS 2105139 3/1983 United Kingdom .

OTHER PUBLICATIONS

"The TRS 80 Microcomputer Technical Reference Handbook", Radio Shack, A Division of Tandy Corporation, 1978.

Primary Examiner—James J. Groody
Assistant Examiner—David E. Harvey
Attorney, Agent, or Firm—Jerry A. Miller

[57] ABSTRACT

An all digital video synchronization technique wherein a microprocessor tracks the incoming video signal and synchronizes its operation by stopping at a certain point in the sync signal and restarting upon occurrence of a horizontal sync pulse.

12 Claims, 8 Drawing Figures

DIGITAL VIDEO SYNC DETECTION

BACKGROUND OF THE INVENTION

The subject invention relates to improvements in video processing systems. The subject invention finds particular application in a slow scan digital video processor utilizing microprocessor techniques.

Prior art video signal processing systems for converting a video signal to digital format and storing frames of digital data are known. See U.S. Pat. No. 4,148,070. Such video processors have typically used analog or a combination of analog and digital techniques to detect and regenerate sync signals required by the video format. It has appeared desirable to the inventors to devise a technique whereby the sync detection functions can be accomplished in a microprocessor environment, avoiding as many analog functions as possible. Among the obstacles to implementing such a technique is the necessity to properly synchronize microprocessor operation to the incoming video signal. Without such synchronization improper storage of the video data will result.

SUMMARY OF THE INVENTION

It is therefore an object of the invention to provide a digital video sync detection technique for use with a microprocessor-based frame storage and transmission system. It is a further object of the invention to reliably synchronize microprocessor operation with incoming video synch signals.

Additional objects and advantages of the invention will be apparent to those skilled in the art from the following description.

In accordance with the invention, the incoming sync signals are converted to digital format and fed to a microprocessor, which is programmed to recognize the sync pattern. The processor tracks the digital sync signal by testing logic levels assigned to the signal, and stops its own operation prior to occurrence of a horizontal sync pulse. Processor operation is restarted upon occurrence of the horizontal sync pulse, thereby synchronizing processor operation to the incoming sync signal.

BRIEF DESCRIPTION OF THE DRAWINGS

The just-summarized invention will now be described in detail in conjunction with the drawings of which.

DETAILED DESCRIPTION OF THE PREFERRED EMBODIMENT

Figure 1:
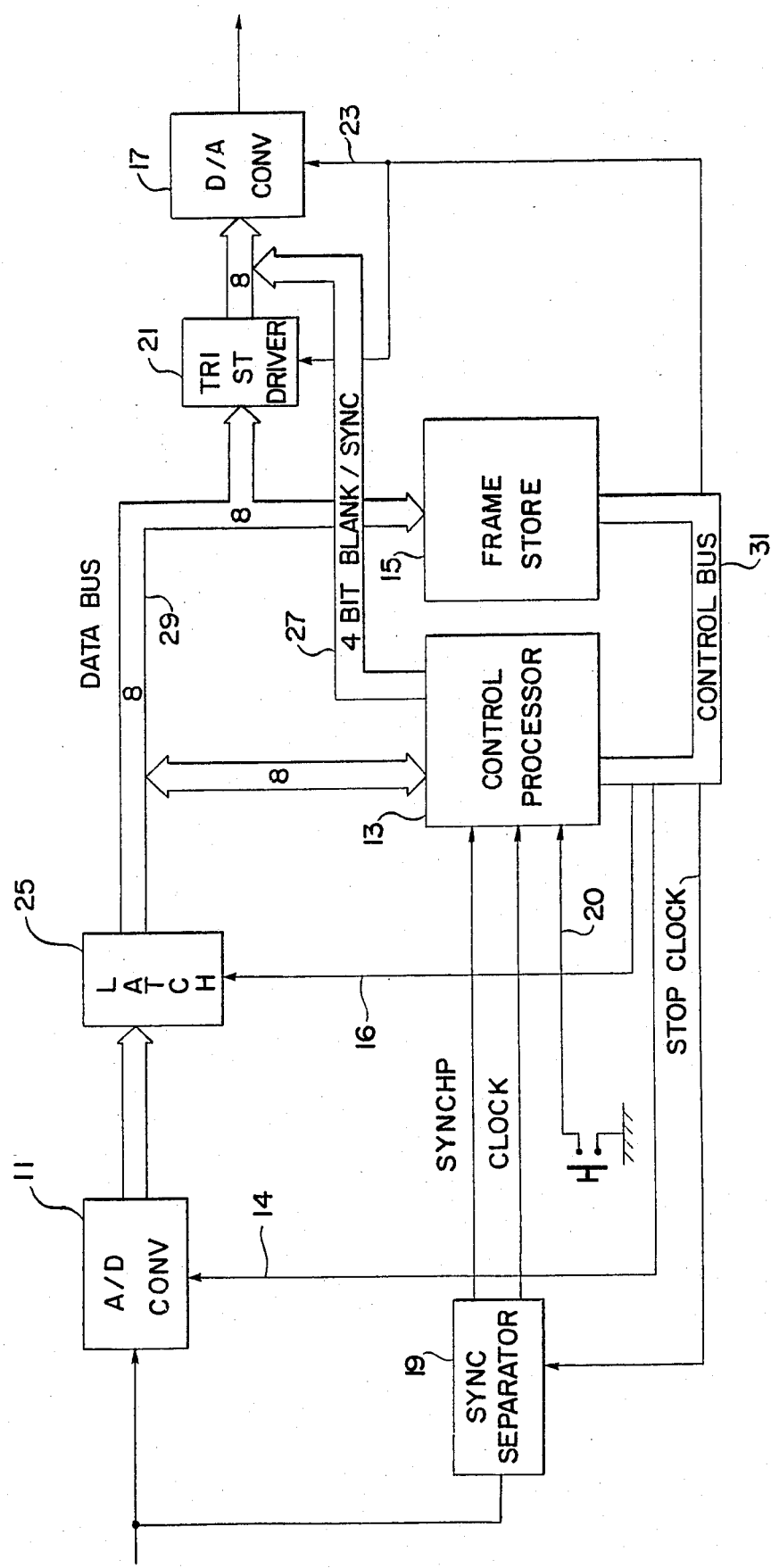
FIG. 1 illustrates a digital processor-based video processor.

A digital video processor is shown in FIG. 1. It includes an A/D converter 11, a programmed control processor 13, a frame store 15 and a D/A converter 17. The preferred processor 13 is a microprocessor having a microinstruction excecution time (referred to hereafter as "cycle" time) of 217 nanoseconds. Such a microprocessor is preferably configured from the commercially available 2900 series logc.

In the circuitry of FIG. 1, operation is initiated by a "freeze" signal applied manually or automatically to the processor over a line 20. A frame of analog video signal, such as from a TV camera, is converted to digital information by the A/D 11, passed through a latch 25, and stored in the frame store 15 by the control processor 13. The A/D 11 is clocked and controlled over a control line 14, while the latch 25 is controlled over a line 16. The frame store 15 is controlled by the processor 13 over a control bus 31, which supplies control signals including a number of address bits, preferably stored by an incrementable address register in the control processor 13.

After a frame is stored in the frame store 15, the processor 13 may cause the frame to be outputted over an 8-bit parallel data bus 29, through a tri-state driver 21 to the D/A converter 17 in order to output an analog TV picture. Control information used in outputting a frame is transmitted over a blank/sync bus 27 to the D/A converter.

The TV picture in the frame store 15 actually contains 256 lines each having 256 points. Each point is represented by a digital number. The TV picture tube successively scans these points and controls their color as instructed by the digital number to form the composite picture. To control the scanning, vertical and horizontal sync pulses are used. The vertical sync brings the scanner (the "spot") to the upper left corner of the TV picture. The scanner then employs the output of the frame store 15 to scan the first line. At the end of the first line the scanner receives a horizontal sync signal which causes the scanner to drop to the next line.

Figure 2:
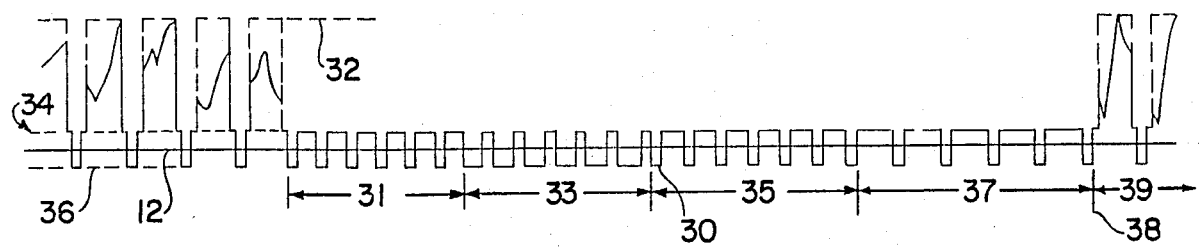
FIG. 2 illustrates a standard format video signal.

A standard format video signal is shown in FIG. 2. This signal transits through levels known as "white" 32, "black" 34 and "blacker-than-black" 36. The video signal successively includes (1) an equalizing pulse train 31, (2) a vertical sync pulse train 33, (3) a second equalizing pulse train 35, (4) a horizontal sync pulse train 37, (5) alternating analog video and horizontal sync pulses 39. The time interval between the last horizontal sync pulse and the beginning of the equalizing pulse train of the vertical sync pattern is "H" (63.5 $\mu$s) for Field 1 and 0.5 H (31.7 $\mu$s) for Field 2.

In a digital video processor implementation, it proves desirable to provide the processor with the capability to recognize the format of standard video signals. It further proves desirable to synchronize the processor operation with the horizontal sync signals in order to properly time sampling of the video data which follows a horizontal sync pulse. Particularly, it is desirable to synchronize timing with the transition 42 to the "blacker-than-black" level 36 of the horizontal sync pulse. One approach considered is that of using the processor to sample and test the level of the horizontal sync pulse. However, because the processor cycle typically does not coincide with the blacker-than-black transition, reliable synchronization may not be achieved by this method.

Figure 4:
FIG. 4 illustrates the video picture edge produced by improperly timed sampling of the video signal.
Figure 3:
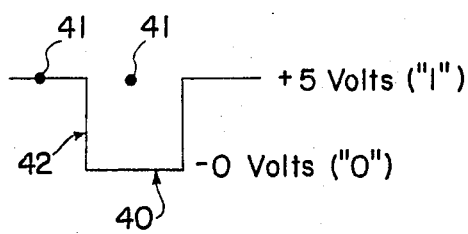
FIG. 3 is a waveform diagram illustrating processor cycle time compared to the blacker-than-black transition in a standard format video signal.

This problem is illustrated in FIGS. 3 and 4. FIG. 3 shows the blacker-than-black transition or edge 42. The dots 41 indicate processor cycle points where the processor might test sampled values of a horizontal sync pulse 40. As shown, these sample points 41 leave considerable uncertainty in detection of the transition time. The result is that the edge of the stored video picture is not smooth, but is serrated in appearance, as shown in FIG. 4.

Figure 5:
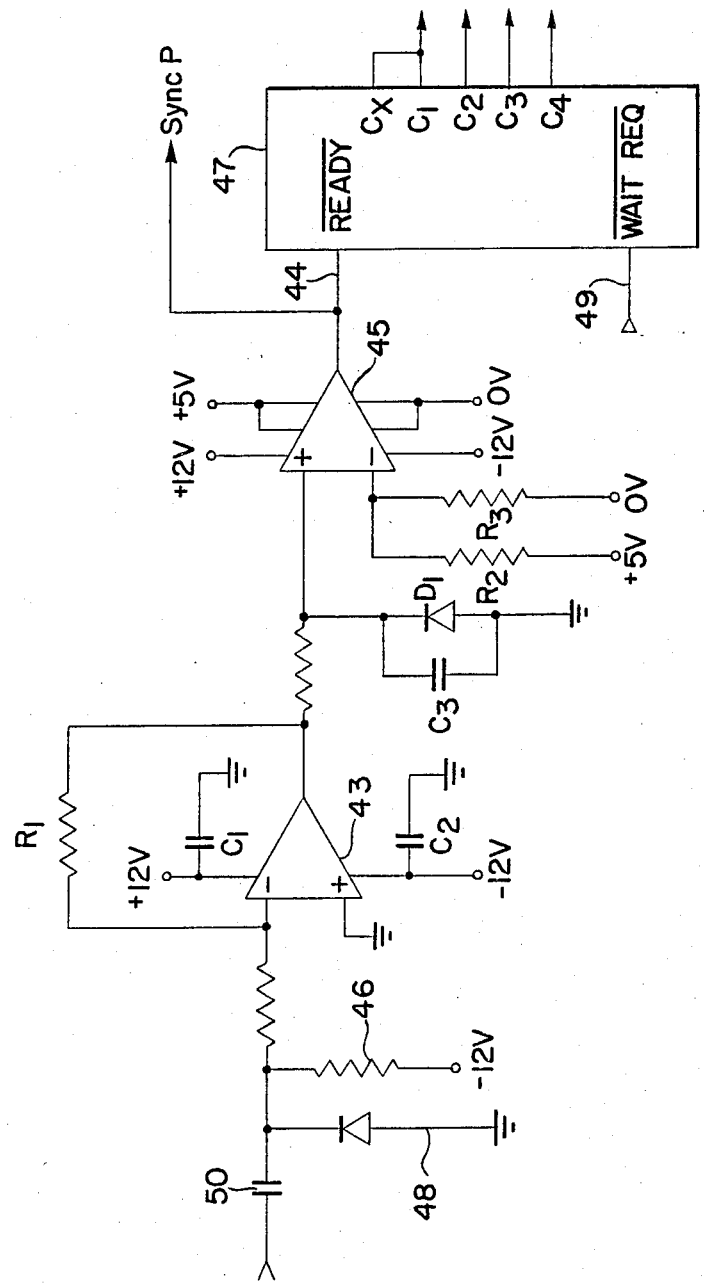
FIG. 5 is a circuit diagram of a sync separator circuit.

In order to avoid this result and provide a wholly digital signal tracking apparatus, a sync separator circuit 19 and certain microprocessor techniques are employed. The sync separator circuit 19 is shown in detail in FIG. 5. It functions to clip the input video signal to the A/D converter 11 below the blacker-than-black level (e.g., line 12 in FIG. 1), providing a rectangular pulse train.

In the sync separator circuit 19, the sync level 36 (FIG. 2) of the input video signal is clamped to negative 0.6 volts by input circuitry including a capacitor 50, a diode 48 and a resistor 46. The level 34 is at negative 0.3 volts at this point. The clamped signal is inputted to an amplifier 43 (LM 318), which outputs to a comparator 45 (LM 361). The amplifier 43 is configured with an input resistor $R_{11}$, a resistor $R_1$ connected from output to inverting input, and capacitors $C_1$ and $C_2$ connected to respective supply voltages. A resistor $R_{22}$ is connected between the output of amplifier 43 and the non-inverting input of amplifier 45. This noninverting input is also connected to a parallel combination of a diode $D_1$ and a capacitor $C_3$, which are grounded at their respective opposite terminals. The inverting input of comparator 45 is connected to two resistors $R_2$, $R_3$ which are connected to respective supply levels of zero and five volts.

The resultant pulse supplied to the comparator 45 is an inverted and amplified version of the input to the amplifier 43 with levels 34 and 36 at $+1.5$ and $+3$ volts respectively. The output SyncP of the comparator 45 is the desired clipped pulse train with the zero volt pulse peak designated logic zero and the $+5$ volts designated logic one (e.g., FIG. 3). The logic zero output corresponds to the "blacker-than-black" level 36.

The clipped pulse train SyncP is supplied to a clock generator 47 (AM 2925). Another input to the clock generator 47 comes from a stop control bit supplied by the processor 13 on a line 49.

In order for the processor 13 to properly store a frame, it is necessary for it to track the sync signals, beginning with the leading vertical sync pattern 33. In the preferred embodiment, the processor 13 relies on knowledge of what this waveform should be at specific times. The processor 13 tests SyncP at various instants to determine whether it is "1" or "0". The logic value of SyncP over various intervals indicates what portion of the video signal is being received. This technique provides a great simplification, for example, over sampling the waveform and comparing an eight-bit sample to a stored value.

Figure 6:
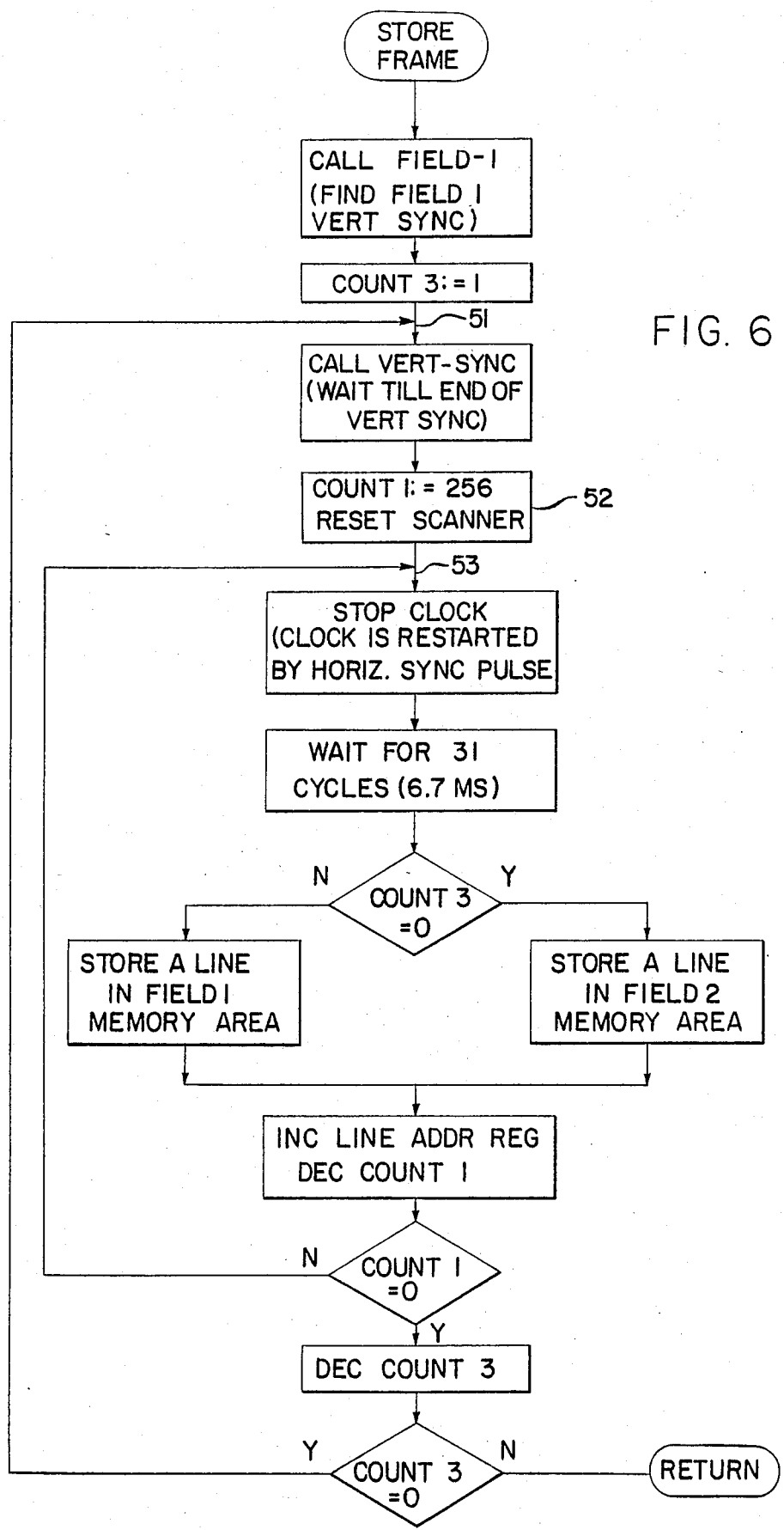
FIG. 6 is a flow chart illustrating the synchronization technique of the preferred embodiment.

A flow diagram illustrating sync tracking in the preferred embodiment of the invention is shown in FIG. 6. This flow will be discussed in conjunction with FIG. 2, which illustrates a standard video format. The flow of FIG. 6 illustrates storage of an interlaced picture (two fields). The routine shown can be readily adapted to the simpler case of storing only one field.

When a freeze signal is received by the processor, it enters the subroutine of FIG. 6. The processor first performs a routine denoted "Field I." This routine tests the logical value of the sync signal train (FIG. 2) until it recognizes the beginning of the vertical sync pattern 31 for Field 1.

At the end of "Field I," a counter denoted COUNT 3 is set equal to one, indicating the first field is to be stored. Then a routine denoted "VERT-SYNC" is performed. This routine tests the logical value of the sync pulse train until the last vertical sync pulse 30 is found and then waits 3 H (190.5 µs), the length of the equalizing pulse interval 35. At the end of VERT SYNC, a processor register COUNT 1 is set equal to 256 to serve as a line counter in connection with storage of the imminent video data. Setting of this register is indicated by block 52 of FIG. 6.

At this point, the technique according to the invention for synchronizing sampling is undertaken. After Count 1 is set to 256, the processor 13 is stopped. This is accomplished by provision of a micro instruction which applies a logic "0" to the wait request input of the clock 47, shown as part of the sync separator circuit 19. The occurrence of the next sync pulse on line 44 restarts the clock 47 precisely at the transition of the sync pulse, thus synchronizing timing. From this transition point 42 (FIG. 3), it is known that the video information will follow in 6.7 microseconds (31 cycles).

Thus, the processor 13 waits for 6.7 microseconds and then begins storing a line in the Field 1 memory. After storage of the line, the line address register of the processor memory control is incremented by 1 to prepare for addressing the next line. COUNT 1 is also decremented by one. Then COUNT 1 is tested, and if it is not zero a loopback to point 53 results. The processor clock 47 is again stopped, restarted at the next sync transition 42 and a line stored. This process is repeated until all 256 lines of Field 1 are stored. Then COUNT 3 is decremented to zero which results in a loop back to point 51 (FIG. 6) to store the second field, Field 2. It may be noted that black lines are stored through interval 37 until video information appears after point 38 in FIG. 2.

Figure 7:
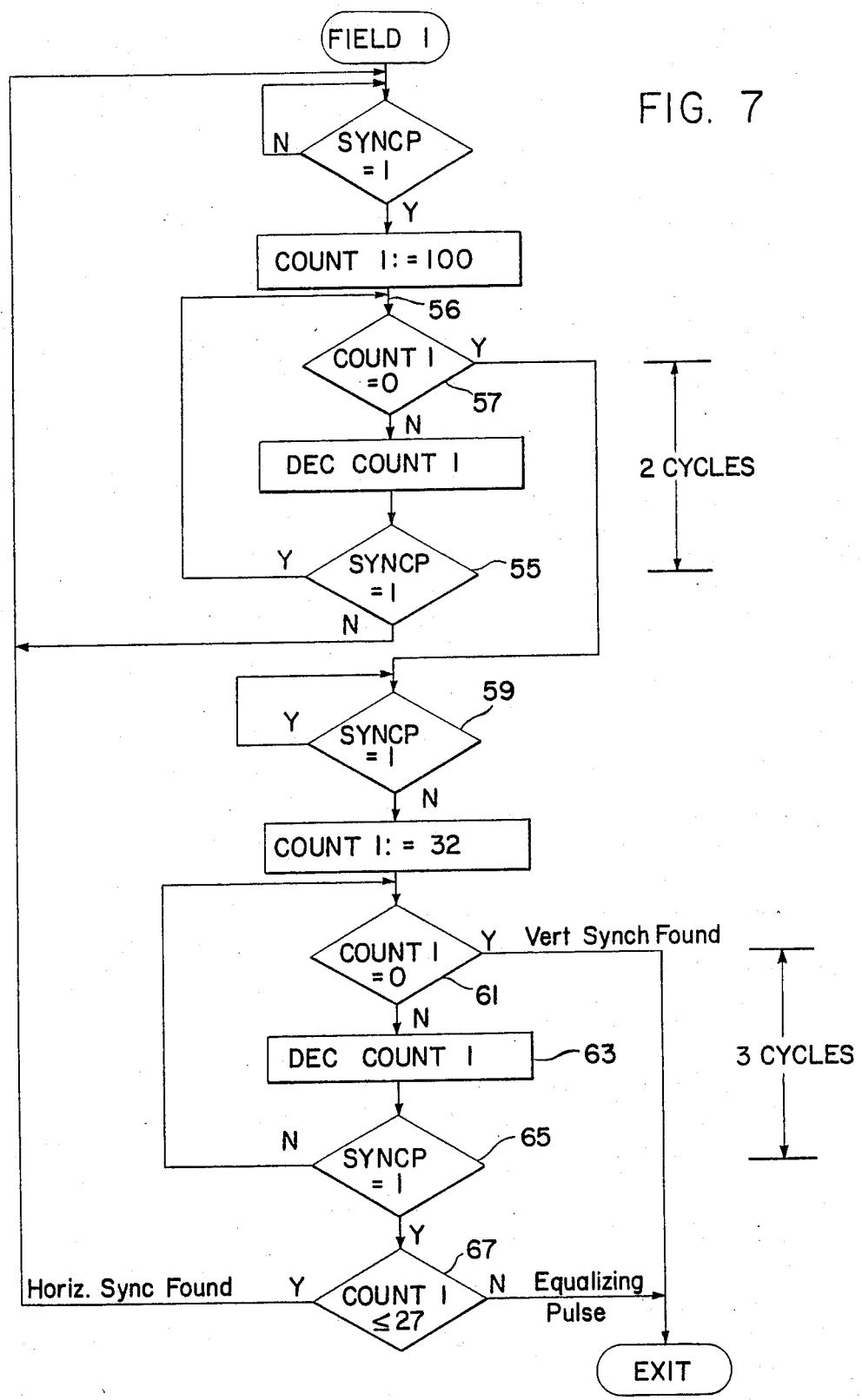
FIG. 7 is a flow chart illustrating in more detail a portion of the flow of FIG. 6.

A detailed flow of routine Field 1 is shown in FIG. 7. As shown, SyncP is first tested until a "1" is detected. This test occurs every 2 cycles. SyncP equal to one indicates a space between sync pulses has been found. The separation between sync pulses may be either of duration H (63.5 µs) or 0.5 H (31.7 µs).

Thus, after SyncP=1 is detected, a counter COUNT 1 is set equal to 100. This counter is then decremented and SyncP again tested at test 55. Test 55 occurs every 2 cycles (every 434 nanoseconds in the preferred processor). If SyncP is equal to 1 (a logic "1" value at comparator 45 output), COUNT 1 is again decremented. As long as SyncP is "1" when tested at test 55, the loop entered at point 56 will be performed until COUNT 1 equals zero. However, if SyncP should be zero when test 55 is performed, Field 1 is entered at the start.

Thus, when COUNT 1 equals zero at test 57, the time interval between sync pulses was H (63.5 µs). This is known because the processor has walked 200 cycles, about 70% of H, without detecting a sync pulse.

SyncP is then tested at a test 59 to locate the next sync pulse. When that sync pulse is detected, COUNT 1 is set to 32 and a loop 61, 63, 65 is entered. If, in the loop 61, 63, 65, SyncP is tested 32 times without detecting a "1", Field 1 is exited. At this point, the beginning of the vertical sync pulse interval 33 has been found. This is Field 1 for EIA Standard RS-330.

If, in loop 61, 63, 65, SyncP is found to be one, a test 67 of COUNT 1 is made. If COUNT 1 is less than 27, Field 1 is performed again. A horizontal sync pulse was found. If COUNT 1 is greater than 27, Field 1 is exited. An equalizing pulse was found. This is Field 1 for EIA Standard RS-170.

Figure 8:
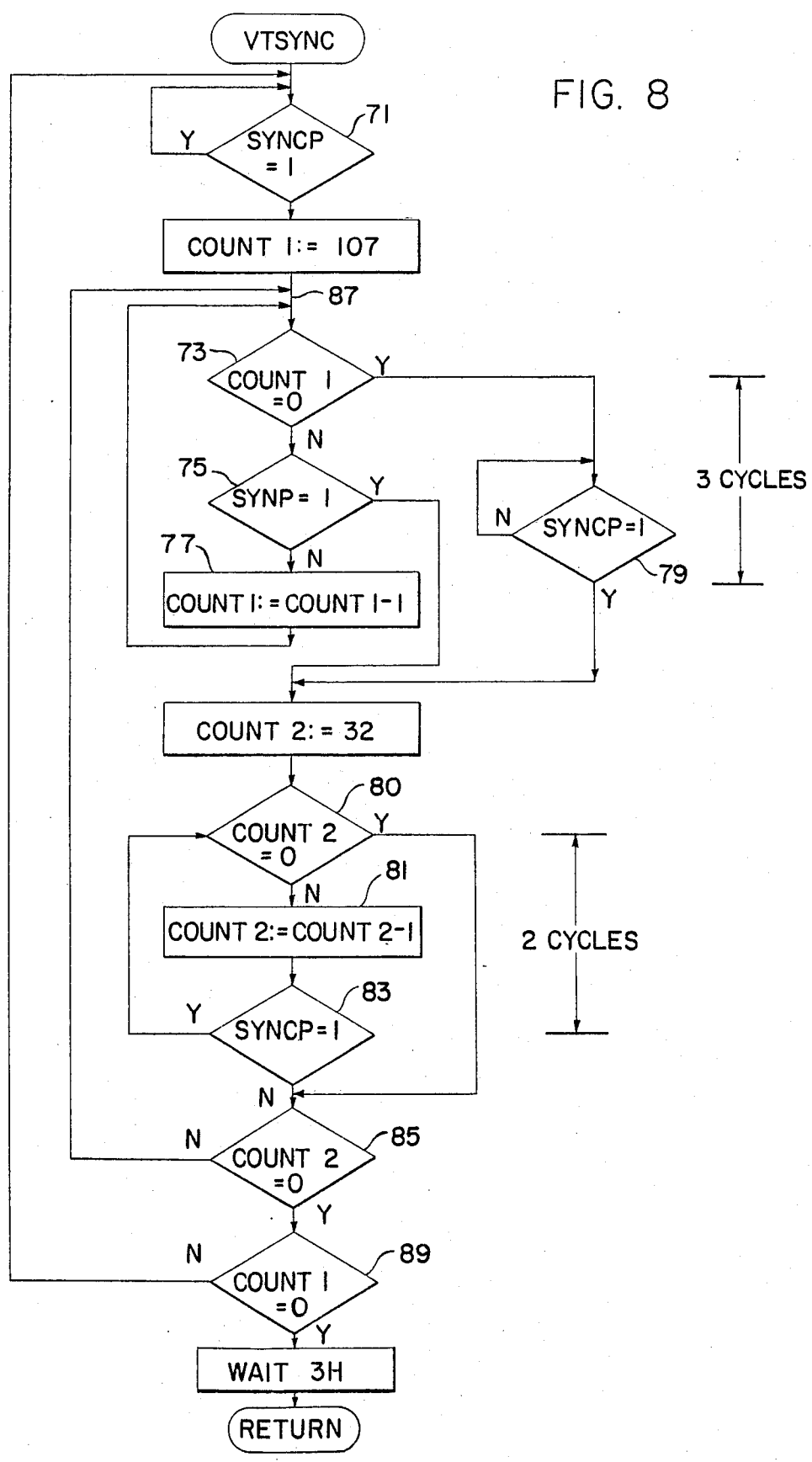
FIG. 8 is a flow chart illustrating in more detail a portion of the flow of FIG. 6.
Figure 9:
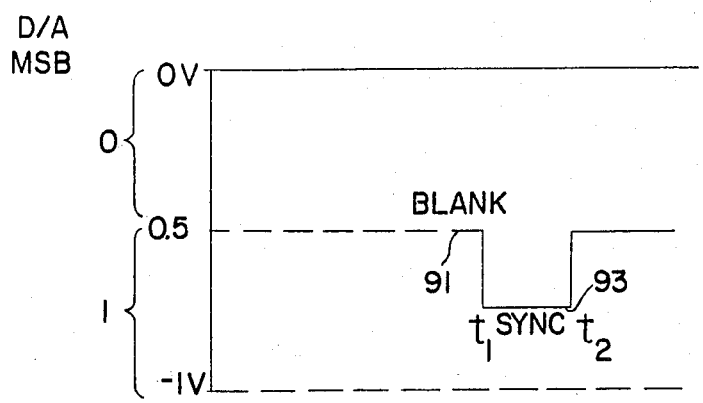
Figure 10:
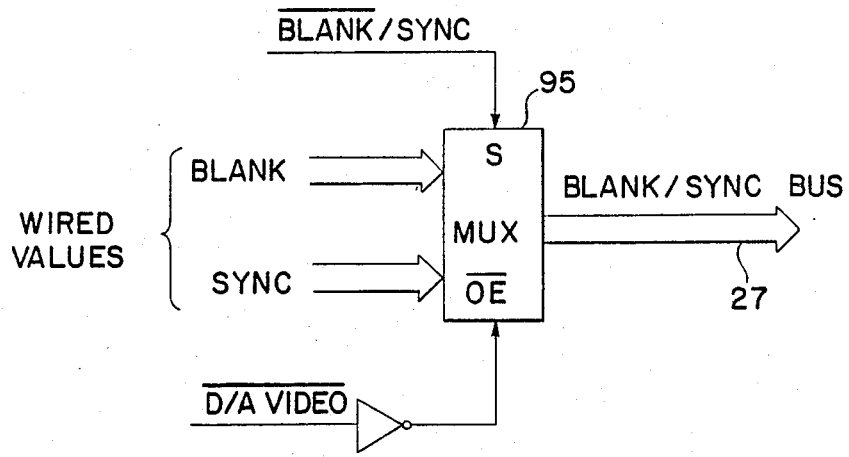

A detailed flow for VERT SYNC is shown in FIG. 8. VT SYNC loops in a test 71 until SyncP equals zero (i.e., a sync pulse is detected; the processor doesn't know which one). COUNT 1 is then set to 107 and a loop 73, 75, 77, testing SyncP, is performed. If SyncP is zero for 107 counts, the program remains in the loop 73, 75, 77 and then exits to a test 79, which loops until SyncP equals one. When test 75 or test 79 is satisfied, the routine proceeds to set a counter denoted COUNT 2 to 32. At this point, COUNT 1 contains 107 minus the total number of blacker-than-black elements that the program has detected.

Next, COUNT 2 is decremented and SyncP tested in a loop 80, 81, 83 to determine the length of the interval between sync pulses. If SyncP is detectd unequal to "one" at any time or COUNT 2 equals zero during loop 80, 81, 83; the routine proceeds to test 85. If test 85 shows COUNT 2 is not zero, the routine is walking the vertical sync pulse interval. The routine re-enters at point 87 and continues subtracting from COUNT 1 the number of blacker-than-black elements that the program detects. If test 85 shows COUNT 2 equals zero, it means that the routine is walking a video line. In such case, COUNT 1 is tested at test 89. If COUNT 1 is not zero at test 89, VT SYNC is re-entered. If COUNT 1 equals zero at test 89, the routine has passed the last vertical sync pulse and then waits 3 H and returns to the main subroutine of FIG. 6.

The foregoing description provides a method by which a digital processor may track and synchronize itself to an incoming sync signal. Many modifications and adaptations of the disclosed method and apparatus will be apparent to those skilled in the art from the subject disclosure. Therefore, it is to be understood that, within the scope of the appended claims, the invention may be practiced other than as specifically described herein.

What is claimed is:

1. A method of synchronizing sampling in a video processor including a programmable microprocessor, said microprocessor being driven by a clock, comprising the steps of:
    stopping the clock to said microprocessor prior to an occurrence of a horizontal sync pulse in order to halt all instruction execution by said microprocessor,
    starting said clock upon the occurrence of said horizontal sync pulse in order to restart the instruction execution by said microprocessor, and
    sampling a video signal during times when said clock is running.

2. The method of claim 1 wherein said starting step further comprises the steps of detecting a first transition to blacker-than-black of said horizontal sync pulse and starting said clock upon said detection of the first transition to blacker-than-black of said horizontal sync pulse.

3. A method of synchronizing operation of a programmed digital video processor to a video sync signal, said programmed digital video processor including a microprocessor being driven by a clock, comprising the steps of:
    generating a pulse train comprising pulses of said video sync signal which fall below a selected threshold;
    stopping the clock to said microprocessor prior to an occurrence of a horizontal sync pulse in said pulse train in order to halt all instruction execution by said microprocessor; and
    starting said clock upon an occurrence of a transition in said pulse train corresponding to the occurrence of said horizontal sync pulse in order to restart the instruction execution by said microprocessor.

4. The method of claim 3 further comprising the steps of: tracking, in the programmed digital video processor, said pulse train by testing for a presence of a predetermined signal pattern in said pulse train prior to the stopping of said clock.

5. A method of synchronizing operation of a programmed digital video processor, said programmed digital video processor including a microprocessor being driven by a clock, comprising the steps of:
    generating a pulse train comprising pulses of a video sync signal which fall below a selected threshold;
    assigning logic levels to the pulses in said pulse train;
    detecting a vertical sync pattern in the pulse train by testing said logical levels, said vertical sync pattern having a last pulse;
    detecting occurrence of the last pulse in said vertical sync pattern;
    timing an interval approximately equal to an interval between the last pulse and a first horizontal sync pulse following said last pulse;
    detecting a signal transition in said first horizontal sync pulse;
    stopping the clock to said microprocessor, thereby halting all instruction execution by said microprocessor after the timing of said interval and restarting the clock to said microprocessor in coincidence with said detection of said signal transition in order to restart instruction execution by said microprocessor; and
    wherein prior to the stopping of said clock, a processor register is set and wherein said set processor register serves as a line counter for subsequent storage of video data.

6. The method of claim 5 further comprising prior to the detecting of said vertical sync pattern, a step of detecting a second horizontal sync pulse or detecting an equalizing pulse is performed.

7. The method of claim 5 wherein, said set processor register serves as a line counter and, after performing a step of storing a line of the video data, said processor register is decremented.

8. Apparatus for processing a video signal comprising:
    a processor means including a microprocessor;
    clock means for clocking said microprocessor and having a first input triggerable to stop said clocking of said microprocessor in order to halt all instruction execution by said microprocessor and a second input triggerable to restart said clocking in order to restart the instruction execution by said microprocessor;
    a sync separator means for producing a pulse train from sync levels of said video signal and supplying said pulse train to said second input and to said processor means.

9. The apparatus of claim 8 wherein said processor means has a control lead connected to said first input and provides a control signal which stops said clock means at selected times during said pulse train.

10. A slow scan video processing system, comprising:
input means for receiving an analog video signal;
an A/D converter, coupled to said input means, for converting said analog video signal to a digital video signal;
a frame store coupled to said A/D converter for receiving and storing a frame of said digital video signal;
a sync separator coupled to said input for detecting a horizontal sync signal in said analog video signal;
a control processor including a microprocessor coupled to said frame store for controlling said frame store;
a clock coupled to said microprocessor for providing a clock signal to said computer;
means responsive to an output of said control processor for stopping said clock signal to said microprocessor prior to the detection of said horizontal sync signal in order to halt all instruction execution by said microprocessor; and
means for restarting said clock signal to said microprocessor upon the detection of said horizontal sync signal in order to restart the instruction execution by said microprocessor.

11. A method of synchronizing operation of a programmed digital video processor to a video sync signal, said programmed digital video processor including a microprocessor being driven by a clock, comprising the steps of:
generating a pulse train comprising pulses of said video sync signal which fall below a selected threshold;
stopping the clock to said microprocessor prior to occurrence of a horizontal sync pulse in said pulse train in order to halt all instruction execution by said microprocessor;
starting said clock upon occurrence of a transition in said pulse train corresponding to the occurrence of said horizontal sync pulse in order to start the instruction execution by said microprocessor;
detecting the presence of a vertical sync pulse pattern in said pulse train by testing for the presence of a predetermined signal pattern in said pulse train prior to stopping said clock; and
detecting the occurrence of said transition in said horizontal sync pulse only after the step of detecting the presence of a vertical sync pulse pattern.

12. Apparatus for processing an analog video signal comprising:
a processor means including a microprocessor;
clock means for clocking said microprocessor and having a first input triggerable to stop said clocking of said microprocessor in order to halt all instruction execution by the microprocessor and a second input triggerable to restart said clocking in order to restart the instruction by the microprocessor;
a sync separator means for producing a pulse train from sync levels of said video signal and supplying said pulse train to said second input and to said processor means;
said processor means including a control lead connected to said first input for providing a control signal which stops said clock means at selected times during said pulse train;
means for converting said video signal to a digital signal; and
a frame store controlled by said control processor to store digital video information contained in said digital signal.

* * * * *